US010886548B2

(12) United States Patent
Milnes et al.

(10) Patent No.: US 10,886,548 B2
(45) Date of Patent: Jan. 5, 2021

(54) HYDROGEN MANAGEMENT IN ELECTROCHEMICAL SYSTEMS

(71) Applicant: Open Water Power, Incorporated, Somerville, MA (US)

(72) Inventors: Thomas B. Milnes, Beverly, MA (US); Thomas Humplik, Albuquerque, NM (US); Ian S. McKay, Seattle, WA (US)

(73) Assignee: L3 Open Water Power, Inc., Somerville, MA (US)

( * ) Notice: Subject to any disclaimer, the term of this patent is extended or adjusted under 35 U.S.C. 154(b) by 378 days.

(21) Appl. No.: 15/309,280

(22) PCT Filed: May 7, 2015

(86) PCT No.: PCT/US2015/029596
§ 371 (c)(1),
(2) Date: Nov. 7, 2016

(87) PCT Pub. No.: WO2015/171849
PCT Pub. Date: Nov. 12, 2015

(65) Prior Publication Data
US 2017/0077538 A1    Mar. 16, 2017

Related U.S. Application Data

(60) Provisional application No. 62/046,481, filed on Sep. 5, 2014, provisional application No. 61/989,671, filed on May 7, 2014.

(51) Int. Cl.
*H01M 8/08*    (2016.01)
*H01M 2/14*    (2006.01)
(Continued)

(52) U.S. Cl.
CPC .............. *H01M 8/08* (2013.01); *C25B 1/04* (2013.01); *C25B 9/08* (2013.01); *C25B 15/08* (2013.01);
(Continued)

(58) Field of Classification Search
None
See application file for complete search history.

(56) References Cited

U.S. PATENT DOCUMENTS

| | | |
|---|---|---|
| 1,200,345 A | 10/1916 | Hardy et al. |
| 2,428,470 A | 10/1947 | Powers |

(Continued)

FOREIGN PATENT DOCUMENTS

| | | |
|---|---|---|
| CN | 201112442 Y | 9/2008 |
| CN | 102170138 A | 8/2011 |

(Continued)

OTHER PUBLICATIONS

International Search Report and Written Opinion for Application No. PCT/US15/48046 dated Dec. 28, 2015.
(Continued)

*Primary Examiner* — Barbara L Gilliam
*Assistant Examiner* — Angela J Martin
(74) *Attorney, Agent, or Firm* — Danielson Legal LLC

(57) ABSTRACT

Systems, methods, and apparatus configured for the mitigation of hydrogen accumulation within electrochemical systems are generally described. The systems, methods, and apparatus described herein can be, according to certain embodiments, configured to be part of an electrochemical system in which hydrogen is generated (e.g., as a reaction byproduct).

9 Claims, 6 Drawing Sheets

(51) Int. Cl.

| | | |
|---|---|---|
| *H01M 4/86* | (2006.01) | |
| *H01M 4/90* | (2006.01) | |
| *H01M 8/02* | (2016.01) | |
| *C25B 15/08* | (2006.01) | |
| *C25B 9/08* | (2006.01) | |
| *C25B 1/04* | (2006.01) | |
| *H01M 8/0202* | (2016.01) | |

(52) U.S. Cl.
CPC ............ *H01M 2/14* (2013.01); *H01M 4/8647* (2013.01); *H01M 4/9041* (2013.01); *H01M 8/0202* (2013.01); *Y02E 60/36* (2013.01)

(56) References Cited

U.S. PATENT DOCUMENTS

| | | |
|---|---|---|
| 2,452,066 A | 10/1948 | Purves |
| 3,360,403 A | 12/1967 | Halsall |
| 3,470,026 A | 9/1969 | Juda et al. |
| 3,475,302 A | 10/1969 | Langer et al. |
| 3,507,708 A | 4/1970 | Vignaud |
| 3,513,031 A | 5/1970 | Zaromb |
| 3,528,855 A | 9/1970 | Kosuga |
| 3,576,679 A | 4/1971 | Shipps |
| 3,652,902 A | 3/1972 | Hart et al. |
| 3,708,412 A | 1/1973 | Lofgren |
| 3,717,505 A | 2/1973 | Unkle, Jr. et al. |
| 3,770,504 A | 11/1973 | Bergum |
| 3,772,088 A | 11/1973 | Hennen et al. |
| 3,893,870 A | 7/1975 | Kozawa |
| 3,904,441 A | 9/1975 | Badger |
| 4,140,121 A | 2/1979 | Kuhl et al. |
| 4,158,085 A | 6/1979 | Bilhorn |
| 4,228,225 A | 10/1980 | Rell et al. |
| 4,261,955 A | 4/1981 | Bailey et al. |
| 4,345,008 A | 8/1982 | Breault |
| 4,369,236 A | 1/1983 | O'Rell et al. |
| 4,547,273 A | 10/1985 | Ayers |
| 4,761,348 A | 8/1988 | Kunz et al. |
| 4,764,181 A | 8/1988 | Nakano et al. |
| 4,902,278 A | 2/1990 | Maget et al. |
| 4,942,100 A | 7/1990 | Hunter et al. |
| 5,116,701 A | 5/1992 | Kalisz |
| 5,173,376 A | 12/1992 | Page et al. |
| 5,196,274 A | 3/1993 | Popraysky |
| 5,215,312 A | 6/1993 | Knappe et al. |
| 5,362,577 A | 11/1994 | Pedicini |
| 5,384,685 A | 1/1995 | Tong et al. |
| 5,429,885 A | 7/1995 | Stockburger et al. |
| 5,437,941 A | 8/1995 | Arledge et al. |
| 5,464,453 A | 11/1995 | Tong et al. |
| 5,508,128 A | 4/1996 | Akagi |
| 5,532,074 A | 7/1996 | Golben |
| 5,549,991 A | 8/1996 | Licht et al. |
| 5,800,857 A | 9/1998 | Ahmad et al. |
| 5,821,033 A | 10/1998 | Cromack et al. |
| 5,867,363 A | 2/1999 | Tsai et al. |
| 5,948,464 A | 9/1999 | Delnick |
| 5,980,977 A | 11/1999 | Deng et al. |
| 6,063,515 A | 5/2000 | Epp et al. |
| 6,148,503 A | 11/2000 | Delnick et al. |
| 6,355,369 B1 | 3/2002 | Iarochenko et al. |
| 6,391,205 B1 | 5/2002 | McGinnis |
| 6,453,928 B1 | 9/2002 | Kaplan et al. |
| 6,953,637 B2 | 10/2005 | Hockaday et al. |
| 7,005,206 B2 | 2/2006 | Lawrence et al. |
| 7,029,778 B1* | 4/2006 | Benson ............... H01M 8/065 429/421 |
| 7,132,188 B2 | 11/2006 | Masel et al. |
| 7,169,497 B2* | 1/2007 | Davis .................. H01M 8/065 429/422 |
| 7,282,282 B2 | 10/2007 | Masel et al. |
| 7,316,855 B2 | 1/2008 | Lawrence et al. |
| 7,425,383 B2 | 9/2008 | Nishimura et al. |
| 7,458,965 B2 | 12/2008 | Joshi et al. |
| 7,569,297 B2 | 8/2009 | Masel et al. |
| 7,579,040 B2 | 8/2009 | Lee et al. |
| 7,740,974 B2 | 6/2010 | Masel et al. |
| 7,785,728 B2 | 8/2010 | Masel et al. |
| 8,418,435 B2 | 4/2013 | Hatoum |
| 8,497,043 B2 | 7/2013 | Cleland |
| 8,530,101 B2 | 9/2013 | Qi |
| 2002/0020623 A1 | 2/2002 | Speranza et al. |
| 2002/0031695 A1 | 3/2002 | Smotkin |
| 2002/0155330 A1 | 10/2002 | Tanaka |
| 2002/0167785 A1 | 11/2002 | Kamath |
| 2002/0182482 A1 | 12/2002 | Hockaday et al. |
| 2002/0187400 A1 | 12/2002 | Matsumoto |
| 2003/0031913 A1 | 2/2003 | Pravo et al. |
| 2003/0159354 A1 | 8/2003 | Edlund et al. |
| 2003/0186104 A1 | 10/2003 | Horiuchi et al. |
| 2003/0219650 A1* | 11/2003 | Saruwatari .......... H01M 2/0267 429/218.1 |
| 2003/0228252 A1 | 12/2003 | Shurtleff |
| 2004/0018412 A1 | 1/2004 | Orsbon et al. |
| 2004/0185331 A1 | 9/2004 | Saruwatari et al. |
| 2005/0000161 A1 | 1/2005 | Petersson et al. |
| 2005/0032920 A1 | 2/2005 | Norbeck et al. |
| 2005/0116629 A1 | 6/2005 | Takamura et al. |
| 2007/0122667 A1 | 5/2007 | Kelley |
| 2007/0278153 A1 | 12/2007 | Oriard et al. |
| 2008/0102119 A1 | 5/2008 | Grovender et al. |
| 2009/0159582 A1 | 6/2009 | Chami et al. |
| 2009/0252671 A1 | 10/2009 | Fullerton |
| 2009/0281528 A1 | 11/2009 | Grovender et al. |
| 2010/0183903 A1 | 7/2010 | McGinnis et al. |
| 2010/0248064 A1 | 9/2010 | La O' et al. |
| 2011/0024361 A1 | 2/2011 | Schwartzel et al. |
| 2011/0269007 A1 | 11/2011 | Visco et al. |
| 2011/0303543 A1 | 12/2011 | Fritze |
| 2012/0021261 A1 | 1/2012 | Kim |
| 2012/0031772 A1 | 2/2012 | Dean et al. |
| 2012/0110836 A1 | 5/2012 | Oh et al. |
| 2012/0152841 A1 | 6/2012 | Vissing et al. |
| 2012/0289887 A1 | 11/2012 | Visco et al. |
| 2012/0301798 A1 | 11/2012 | Matsumoto et al. |
| 2012/0318660 A1 | 12/2012 | Cohly et al. |
| 2013/0001162 A1 | 1/2013 | Yangali-Quintanilla et al. |
| 2013/0017414 A1 | 1/2013 | He |
| 2013/0017432 A1 | 1/2013 | Roumi |
| 2013/0244101 A1 | 9/2013 | Meckfessel Jones et al. |
| 2013/0252120 A1 | 9/2013 | Robertson |
| 2013/0276769 A1 | 10/2013 | McKay et al. |
| 2013/0277309 A1 | 10/2013 | Inoue et al. |
| 2013/0306565 A1 | 11/2013 | Davis |
| 2013/0316196 A1 | 11/2013 | McCluskey et al. |
| 2013/0319943 A1 | 12/2013 | Duan et al. |
| 2014/0154595 A1 | 6/2014 | McKay et al. |
| 2014/0266058 A1* | 9/2014 | Sathrum ............... H01M 10/06 320/130 |
| 2015/0221956 A1 | 8/2015 | McKay |

FOREIGN PATENT DOCUMENTS

| | | |
|---|---|---|
| CN | 102623735 A | 8/2012 |
| DE | 19720278 A1 | 11/1998 |
| GB | 2491355 A | 12/2012 |
| JP | S57-172660 A | 10/1982 |
| JP | H02-142069 A | 5/1990 |
| JP | H04-269994 A | 9/1992 |
| JP | 2009-026623 A | 2/2009 |
| KR | 20110133365 A | 12/2011 |
| MY | 133905 A | 11/2007 |
| WO | WO 02/059990 A2 | 8/2002 |
| WO | WO 02/059990 A3 | 8/2002 |
| WO | WO 2010/043914 A2 | 4/2010 |
| WO | WO 2012/161663 A1 | 11/2012 |
| WO | WO 2013/016367 A1 | 1/2013 |

(56) References Cited

FOREIGN PATENT DOCUMENTS

WO    WO 2013/070054 A1    5/2013
WO    WO 2013/154367 A1    10/2013

OTHER PUBLICATIONS

Invitation to Pay Additional Fees for Application No. PCT/US15/29596 dated Oct. 22, 2015.
International Search Report and Written Opinion for Application No. PCT/US15/29596 dated Jan. 6, 2016.
International Preliminary Report on Patentability for Application No. PCT/US15/29596 dated Nov. 17, 2016.
Licht, A novel aqueous aluminumlpermanganate fuel cell. Electrochemistry Communications. Jan. 1999;1(1):33-6.
Shen et al., Development of an aluminum/sea water battery for sub-sea applications. Journal of Power Sources. Jan. 1994;47(1):119-27.

\* cited by examiner

HYDROGEN MANAGEMENT IN ELECTROCHEMICAL SYSTEMS

RELATED APPLICATIONS

This application is a U.S. National Stage patent application based on International Application PCT/US2015/029596, filed May 7, 2015 and entitled "Hydrogen Management in Electrochemical Systems", which claims priority under 35 U.S.C. § 119(e) to U.S. Provisional Patent Application Ser. No. 61/989,671, filed May 7, 2014 and entitled "Hydrogen Management in Electrochemical Systems," and claims priority under 35 U.S.C. § 119(e) to U.S. Provisional Patent Application Ser. No. 62/046,481, filed Sep. 5, 2014 and entitled "Injection of Water in Electrochemical Systems," which are incorporated herein by reference in their entirety for all purposes.

GOVERNMENT SPONSORSHIP

Certain aspects described herein were made with support from the United States Government via the U.S. Navy's Combating Terrorism Technical Support Office and Rapid Reaction Technology Office, under award number N00421-10-D-0001-0017. The government may have rights in certain of the inventions described herein.

TECHNICAL FIELD

Electrochemical systems, including electrochemical systems in which hydrogen is generated as a byproduct, are generally described.

BACKGROUND

Electrochemical cells can be used to generate electrical energy from chemical reactions. In many electrochemical cell systems (including many metal-fuel type batteries and fuel cells), hydrogen is generated during the electrochemical process (e.g., as a reaction byproduct).

Certain aspects of the disclosure are related to the recognition that improved electrochemical systems which allow for decreasing the amount of hydrogen gas within the electrochemical cell without impacting electrochemical performance would be desirable.

SUMMARY

Hydrogen management in electrochemical systems is generally described. In certain embodiments, a hydrogen-permeable medium is used to vent hydrogen generated within the electrochemical cell. In some embodiments, a hydrogen-reaction system is used to react hydrogen generated within the electrochemical cell (e.g., with oxygen to form water) so that the hydrogen is not vented to the external environment. The subject matter of the present invention involves, in some cases, interrelated products, alternative solutions to a particular problem, and/or a plurality of different uses of one or more systems and/or articles.

In one aspect, an electrochemical system is described. The electrochemical system comprises, according to some embodiments, a housing comprising an interior volume in which an electrolyte is exposed to a first electrode comprising an aluminum-based electrode active material and a second electrode, the interior volume comprising an outlet; and a hydrogen-permeable medium that is not substantially permeable to the electrolyte, the medium associated with the outlet and defining an interface between the interior volume of the housing and an environment external to the interior volume.

In certain embodiments, the electrochemical system comprises a housing comprising an interior volume in which an electrolyte is exposed to a first electrode and a second electrode, the interior volume comprising an outlet; a hydrogen-permeable medium that is not substantially permeable to the electrolyte, the medium associated with the outlet and defining an interface between the interior volume of the housing and an environment external to the interior volume; and a hydrogen-reaction system configured to receive hydrogen gas from the hydrogen-permeable medium and to facilitate reaction of the hydrogen gas with oxygen.

According to certain embodiments, the electrochemical system comprises a housing comprising an interior volume in which an electrolyte is exposed to a first electrode and a second electrode, the interior volume comprising an outlet; and a hydrogen-permeable medium that is not substantially permeable to the electrolyte, the medium associated with the outlet and defining an interface between the interior volume of the housing and an environment external to the interior volume.

Certain embodiments are related to an apparatus for transporting water into an electrochemical cell. In some embodiments, the apparatus comprises an osmotic medium fluidically separating an interior compartment of an electrochemical cell from an environment external to the electrochemical cell, wherein the electrochemical cell is configured to consume water as a reactant during operation.

Some embodiments are related to a method of operating an electrochemical cell. According to certain embodiments, the method comprises operating the electrochemical cell to generate an electrical current while water is transported from a water-containing liquid in an environment outside the electrochemical cell into the electrochemical cell across an osmotic medium fluidically separating an interior compartment of the electrochemical cell from the environment outside the electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems, methods, and apparatuses configured for the mitigation of hydrogen accumulation within electrochemical systems are generally described. The systems, methods, and apparatus described herein can be, according to certain embodiments, configured to be part of an electrochemical system in which hydrogen is generated (e.g., as a reaction byproduct).

Many batteries and fuel cells (including zinc-air and lead-acid batteries, and aqueous multivalent metal batteries in general) generate hydrogen gas as their reactants are consumed. Generally, it is important to continually remove hydrogen gas from the electrochemical system to prevent pressure build-up that might rupture the cell. In particular, it is desirable in many instances to mitigate hydrogen buildup while preventing substantial leaking of other compounds inside the cell, such as liquid electrolyte(s). For example, it would be desirable, in many instances, to allow for low pressure-gradient hydrogen gas release and/or reaction while retaining the liquid electrolyte within the electrochemical cell. Certain aspects of the present disclosure are related to a system that reduces hydrogen gas concentration (e.g., via emission and/or reaction) while retaining electrolyte. In some such embodiments, the system allows for the selective reduction in the concentration of hydrogen gas even when the electrolyte of the electrochemical cell is highly reactive.

In some embodiments, the release of gases from batteries and fuel cells is managed using one or more chemically-resistant membranes. In certain embodiments, such systems are used to manage hydrogen gas that is created as a byproduct of aluminum fuel-metal batteries and fuel cells.

Figure 1A:
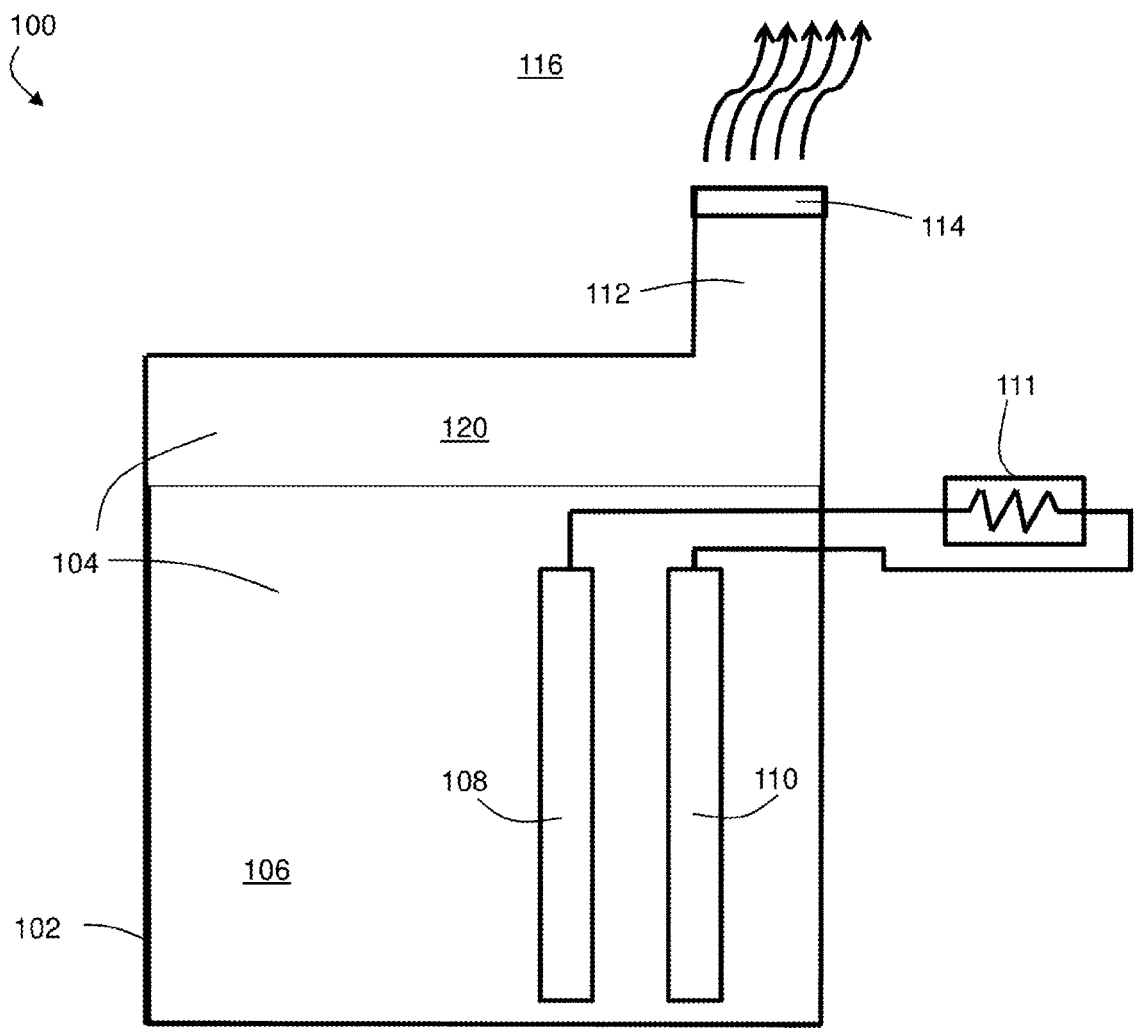
FIG. 1A is cross-sectional schematic illustration of an electrochemical system comprising a hydrogen-permeable membrane, according to certain embodiments.

FIG. 1A is a cross-sectional schematic illustration of an electrochemical system 100. Electrochemical system 100 comprises housing 102, which defines interior volume 104. The walls of housing 102 can be rigid or flexible, and they may be made of any of a variety of suitable materials, including, but not limited to, metals (e.g., steel, titanium, and the like) polymers (e.g., acrylic, polyurethane, silicone, polytetrafluoroethylene, polyethylene), or composites, such as fiberglass or carbon fiber.

In electrochemical system 100, housing 102 contains electrolyte 106. In some embodiments, the electrolyte is exposed to first and second electrodes within the interior volume of the housing. For example, in FIG. 1A, electrolyte 106 is exposed to first electrode 108 (e.g., an anode) and second electrode 110 (e.g., a cathode) within interior volume 104 of housing 102. Electrochemical system 100 can be configured to generate electrical current via an electrochemical reaction between first electrode 108 and second electrode 110. During operation, the electrochemical reaction between the first and second electrodes can result in the transport of ions through the electrolyte between the first and second electrodes and the transport of electrons through an external load between the first and second electrodes (e.g., from the anode to the cathode). In certain embodiments, an electrical load external to the electrochemical system can be driven using electrical current generated by the electrochemical cell. For example, referring to FIG. 1A, electrical load 111 can be connected to electrochemical system 100 such that the electrical current generated by the electrochemical system powers the electrical load.

In certain embodiments, the electrochemical reaction between first electrode 108 and second electrode 110 generates hydrogen as a byproduct. As described in more detail below, it may be desirable to reduce the concentration of hydrogen byproduct within the electrochemical system, for example, by venting and/or reacting the hydrogen byproduct.

In some embodiments, the housing comprises an outlet. For example, in FIG. 1A, housing 102 comprises outlet 112. In some such embodiments, a hydrogen-permeable medium that is not substantially permeable to the electrolyte within the housing is associated with the outlet of the housing. The hydrogen-permeable medium can define an interface between the interior volume of the and an environment external to the interior volume of the housing. For example, in FIG. 1A, hydrogen-permeable medium 114 defines an interface between interior volume 104 of housing 102 and environment 116 external to interior volume 104.

In some embodiments, the hydrogen-permeable medium is a layer associated with the outlet. In some such embodiments, the hydrogen-permeable medium can be in the form of a flat sheet, for example, having a thickness of less than about 5 mm, less than about 2 mm, or less than about 1 mm. In some embodiments, the hydrogen-permeable medium can have a first dimension, perpendicular to its thickness, that is at least about 10, at least about 50, or at least about 100 times longer than the thickness of the hydrogen-permeable medium. In certain embodiments, the hydrogen-permeable medium can have a second dimension, perpendicular to its thickness and to the first dimension, that is at least about 10, at least about 50, or at least about 100 times longer than the thickness of the hydrogen-permeable medium.

Figure 2:
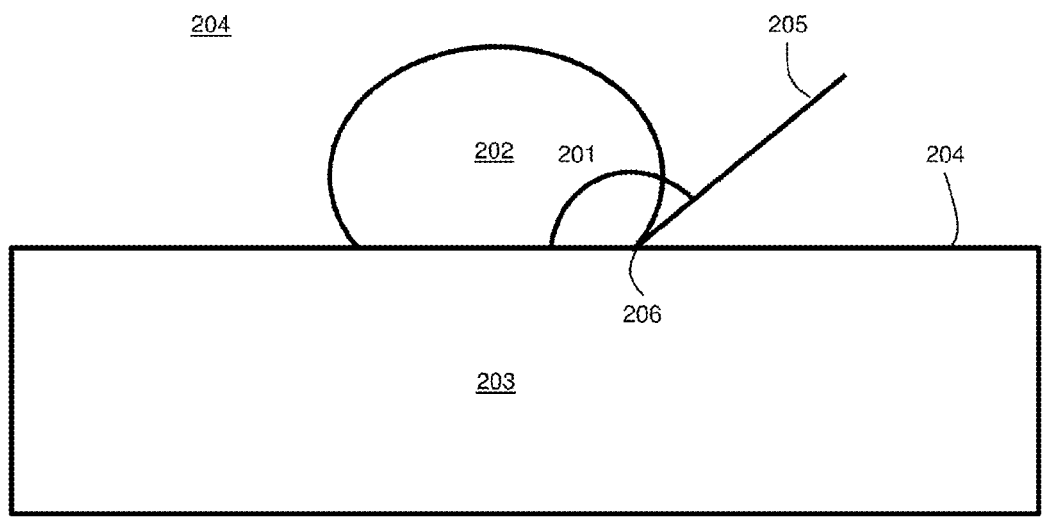
FIG. 2 is an exemplary cross-sectional schematic illustration illustrating the interaction between a water droplet and a hydrophobic material.

In some embodiments, the hydrogen-permeable medium is hydrophobic. The use of a hydrophobic material in the hydrogen-permeable medium can help prevent water-based electrolytes from being wicked through the hydrogen-permeable medium, limiting undesirable transport of electrolyte through the hydrogen-permeable medium into the external environment. Generally, a material is "hydrophobic" when a droplet of water forms a contact angle greater than 90° when placed in intimate contact with the material in question in air at 1 atm and 25° C. A material is generally "hydrophilic" when a droplet of water forms a contact angle of less than 90° when placed in intimate contact with the material in question in air at 1 atm and 25° C. The "contact angle," in the context of hydrophobicity and hydrophilicity is the angle measured, through the water droplet, between the surface of the material and a line tangent to the external surface of the water droplet at the point of contact with the material surface. FIG. 2 is a schematic illustration of the contact angle 201 formed by a water droplet 202 on a hydrophobic material 203 in air 204. As shown in FIG. 2, contact angle 201 is measured from surface 204 of material 203 through droplet 202 and to a line 205 tangent to the external surface of droplet 202 at the point of contact 206 between droplet 202 and material surface 204. In some embodiments, a water droplet forms a contact angle of more than about 90°, more than about 120°, or more than 150° when placed in intimate contact with the material from which the hydrogen-permeable medium is made, in air at 1 atm and 25° C.

The hydrogen-permeable medium can be made of any suitable material including, but not limited to, polytetrafluoroethylene (PTFE), polycarbonate, polypropylene, nylon, polyethylene, polyester, and/or a metal. In some embodiments, the hydrogen-permeable medium can be made of woven nylon, polyethylene, and/or polyester, optionally covered with a hydrophobic coating (e.g., a silane such as trichlorosilane and/or PTFE). In certain embodiments, the hydrogen-permeable medium can be made of a metal mesh or sinter, which can, optionally, be covered with a hydrophobic coating (e.g., a silane such as trichlorosilane and/or PTFE). In some embodiments, the hydrogen-permeable medium can include pores with an average pore size of less than 100 micrometers (e.g., less than about 10 micrometers, such as from about 1 micrometer to about 100 micrometers or from about 1 micrometer to about 10 micrometers). For example, the hydrogen-permeable medium can be made of a woven material (e.g., nylon, polyethylene, and/or polyester) with an average pore size of less than 100 micrometers (e.g., less than about 10 micrometers, such as from about 1 micrometer to about 100 micrometers or from about 1 micrometer to about 10 micrometers). In some embodiments, the hydrogen-permeable medium can be made of a metal mesh or sinter with an average pore size of less than 100 micrometers (e.g., less than about 10 micrometers, such as from about 1 micrometer to about 100 micrometers or from about 1 micrometer to about 10 micrometers).

In some cases, the material from which the hydrogen-permeable medium is made depends upon the type of electrolyte that is used in the electrochemical system. Those of ordinary skill in the art, given the present disclosure, would be capable of selecting suitable material for use in the hydrogen-permeable medium, using no more than routine experimentation. In some cases, selection of the hydrogen-permeable medium material can be based, at least in part, on the compatibility of the material with the electrolyte being employed. For example, if the electrolyte is highly corrosive, a corrosion resistant hydrogen-permeable medium material could be selected. In some cases, the hydrogen-permeable medium can be selected such that it does not chemically contaminate or otherwise impact the operation of the electrolyte with any electrochemical cell. Determining the compatibility of an electrolyte and a hydrogen-permeable medium can be achieved using no more than routine experimentation, for example, by selecting a candidate material for the hydrogen-permeable medium and measuring its ability to transmit hydrogen while retaining electrolyte after prolonged periods of exposure to the electrolyte.

In some embodiments, the hydrogen-permeable medium can be selected to be compatible with an alkaline electrolyte. Alkaline electrolytes are commonly used in many types of electrochemical systems, including aqueous multivalent metal batteries, metal-air batteries, and the like. Examples of hydrogen-permeable medium materials suitable for this purpose include, but are not limited to, polytetrafluoroethylene (PTFE), polytetrafluoroethylene (PTFE), polycarbonate, and/or polypropylene. Other examples of hydrogen-permeable medium materials suitable for this purpose include, but are not limited to, nylon, polyethylene, and/or polyester, optionally covered with a hydrophobic coating (e.g., a silane such as trichlorosilane, or PTFE).

In some embodiments, the hydrogen-permeable medium comprises a hydrogen-permeable membrane. In some such embodiments, the hydrogen-permeable membrane can be permeable to hydrogen, but substantially impermeable to an electrolyte or other liquid contained within the housing of the electrochemical system. In some embodiments, the hydrogen-permeable medium comprises a microporous membrane (e.g., having pores with cross-sectional diameters from about 0.1 micrometers to about 10 micrometers). Examples of microporous hydrogen-permeable membranes suitable for use in association with certain embodiments include, but are not limited to, membrane disc filters as sold by Sterlitech Corporation (Kent, Wash.) and HTI Water Corporation (Scottsdale, Ariz.).

Hydrogen-permeable medium 114 can be associated with outlet 112 in any suitable fashion. According to certain embodiments, the hydrogen-permeable medium forms at least a portion of a wall of the housing. Referring to FIG. 1A, hydrogen-permeable medium 114 forms an entire wall 116 of housing 102. In other embodiments, the hydrogen-permeable medium can form a portion of a wall of housing 102. The hydrogen-permeable medium and the housing can be integrated with each other in a number of ways. For example, in certain embodiments, the hydrogen-permeable medium can overlay an outlet of the housing, for example, by arranging the hydrogen-permeable medium so that it spans the external and/or the internal surface of the housing adjacent the housing outlet. In certain embodiments, the hydrogen-permeable medium can be adhered, welded, or otherwise attached to the edges of the outlet. In certain embodiments, the wall the housing can be a multilayered structure, and the hydrogen-permeable medium can correspond to a portion of a layer (e.g., an interior layer) of the multilayer structure. In certain embodiments, the hydrogen-permeable medium can form a seal across the housing outlet such that hydrogen can be transported through the outlet of the housing only through the hydrogen-permeable medium and other materials (e.g., the electrolyte) may be restricted (e.g., substantially prevented) from being transported out of the outlet. This arrangement can, according to certain embodiments, prevent electrolyte from leaking from the interior volume of the housing to an environment external to the housing. Those of ordinary skill in the art, given the present specification, would be capable of integrating the hydrogen-permeable medium with the housing structure using a number of other methods. These may include one or more of the following methods: attaching the membrane to the housing by means of a threaded and gasketed fixture, adhering the membrane to the housing with a glue or sealant such as silicone rubber or polyurethane, thermal welding the membrane to the housing, sewing the membrane to the housing with nylon thread, and/or laminating the membrane onto the housing.

In some embodiments, the hydrogen-permeable medium is configured within the electrochemical system such that hydrogen gas generated by the electrochemical reaction within the electrochemical system contacts the hydrogen-permeable medium. For example, in FIG. 1A, electrochemical system 100 can be configured such that when the electrochemical reaction within electrochemical system 100 proceeds, hydrogen gas is transported to headspace 120 within interior volume 104 of housing 102. Upon entering the headspace, at least a portion of the hydrogen gas may contact hydrogen-permeable medium 114. In some such embodiments, the electrolyte 106 within housing 102 may contact hydrogen-permeable medium 114, for example, when the electrolyte moves within the housing. For example, if the electrochemical system is perturbed, inverted, or otherwise moved, it may cause the electrolyte to contact the hydrogen-permeable medium 114. In some such embodiments, the hydrogen-permeable medium can seal the electrolyte within the electrochemical system while allowing hydrogen gas to permeate through it. In this way, the electrolyte will still be contained within the electrochemical cell housing 102 because the hydrogen-permeable medium 114 is generally impermeable to the electrolyte. In some embodiments, hydrogen gas can be transported through the hydrogen-permeable medium 114. For example, hydrogen gas (e.g., in a gaseous bubble or dissolved in the electrolyte, or in any other form) can be capable of passing through the hydrogen-permeable medium upon contacting the hydrogen-permeable medium. After the hydrogen contacts the hydrogen-permeable medium, the hydrogen gas may be vented into the environment or reacted (as described in more detail below). In one particular set of embodiments, the hydrogen-permeable medium is made at least in part, of polytetrafluoroethylene (PTFE). PTFE is generally highly chemically inert, which allows one to operate reliably with a number of common electrochemical reactants and facilitator compounds, including corrosives and oxidizing compounds.

In certain embodiments, the hydrogen-permeable medium is capable of transmitting hydrogen gas at a rate of at least about 100 mL/min/cm$^2$. In some embodiments, the hydrogen-permeable medium is capable of transmitting hydrogen gas at a rate as high as 50 L/min/cm$^2$, or more. The hydrogen gas transmission rate can be measured by placing a membrane sample in series with a throttle valve, pressure transducer, and gas flowmeter at the outlet of a pressurized tank of hydrogen gas. The throttle valve can then be regulated to achieve a specified flow rate of hydrogen gas, and the pressure drop across the membrane corresponding to that flow rate can then be measured using the pressure transducer. The hydrogen gas transmission rate is generally measured at a temperature of 25° C. In some embodiments, the hydrogen-permeable medium is capable of transmitting hydrogen gas at any of the rates outlined herein when the difference in partial pressure of hydrogen across the thickness of the membrane is at at least one value from 0 atmospheres to about 10 atmospheres or at at least one value from about 1 atmosphere to about 10 atmospheres. In some embodiments, the hydrogen-permeable medium is capable of transmitting hydrogen gas at any of the rates outlined herein when the difference in partial pressure of hydrogen across the thickness of the membrane is about 0.1 atmospheres or about 1 atmosphere.

As noted above, the hydrogen-permeable medium can be substantially impermeable to the liquid electrolyte. In some embodiments, the hydrogen-permeable medium transmits liquid electrolyte at a rate of less than about 5 mL/cm$^2$/min, less than about 1 mL/cm$^2$/min, or less than about 0.1 mL/cm$^2$/min, when exposed to the liquid electrolyte at 25° C. This rate can be measured by inverting a sealed housing incorporating a hydrogen permeable membrane over a collection flask, and aggregating the amount of fluid that is deposited in the collection flask as a function of time.

Certain embodiments are related to an apparatus for transporting water into an electrochemical cell. In some embodiments, the apparatus comprises an osmotic medium (e.g., an osmotic membrane) fluidically separating an interior compartment of an electrochemical cell from an environment external to the electrochemical cell. For example, in some embodiments, hydrogen permeable medium 114 can be replaced by or supplemented with an osmotic medium, such as an osmotic membrane. The osmotic medium can be configured to allow at least a portion of water within a water-containing liquid environment external to the interior compartment of the electrochemical cell into the interior compartment of the electrochemical cell. In some such embodiments, the electrochemical cell can be configured such that at least a portion of the water within the water-containing liquid is transported across the osmotic medium into the interior compartment of the electrochemical cell. For example, referring to FIG. 1A, in some embodiments, medium 114 can be an osmotic medium, and water can be transported from environment 116 through medium 114 into interior volume 104. In some such embodiments, the electrochemical cell can be operated to generate an electrical current while water is transported from a water-containing liquid in an environment outside the electrochemical cell into the electrochemical cell across the osmotic medium. For example, referring to FIG. 1A, in some embodiments, electrochemical system 100 can be operated to generate an electrical current (e.g., to drive load 111) while water is transported from water-containing liquid in environment 116 outside the electrochemical cell into the electrochemical cell across osmotic medium 114.

A variety of suitable media can be used as the osmotic medium. In some embodiments, the osmotic medium is an osmotic membrane. In some embodiments, the osmotic medium comprises a solid material. In some embodiments, the osmotic medium comprises a solid porous material. In certain embodiments, the pores of the osmotic medium can be configured such that water or another solvent can be transported through the pores of the osmotic medium while solute ions are not transported through the pores of the osmotic medium. In some embodiments, the osmotic medium comprises a forward osmosis membrane. Non-limiting examples of materials from which the osmotic medium (e.g., osmotic membrane) can be made include, for example, polymers (e.g., organic polymers such as polytetrafluoroethylene (PTFE), polycarbonate, polypropylene, nylon, polyethylene, and/or polyester), and/or a metal. In some embodiments, the osmotic medium can be made of woven nylon, polyethylene, and/or polyester, optionally covered with a hydrophobic coating (e.g., a silane such as trichlorosilane and/or PTFE). In some embodiments, the osmotic medium can include pores with an average pore size of less than 100 micrometers (e.g., less than about 10 micrometers, such as from about 1 micrometer to about 100 micrometers or from about 1 micrometer to about 10 micrometers). For example, the osmotic medium can be made of a woven material (e.g., a polymeric material such as nylon, polyethylene, and/or polyester) with an average pore size of less than 100 micrometers (e.g., less than about 10 micrometers, such as from about 1 micrometer to about 100 micrometers or from about 1 micrometer to about 10 micrometers). Examples of commercially-available osmotic membranes suitable for use in association with certain embodiments include, but are not limited to, membrane disc filters as sold by Sterlitech Corporation (Kent, Wash.) and Hydration Technology Innovations (HTI) (Scottsdale, Ariz.).

In some embodiments, the hydrogen-permeable medium can also serve as an osmotic medium. In some embodiments, the hydrogen-permeable medium is capable of performing forward-osmosis such that water from an environment external to the interior volume can be osmotically transported across the hydrogen-permeable medium into the interior volume. For example, referring to FIG. 1A, in some embodiments, hydrogen-permeable medium 114 can be configured such that it is capable of osmotically transporting water from external environment 116 to interior volume 104 of housing 102. For example, in some embodiments, housing interior 104 can contain a solution with a solute concentration that is higher than the concentration of solutes in the liquid located in environment 116 external to the housing 102. Due to the difference in solute concentrations, water may be transported, via osmosis, across hydrogen-permeable medium 114 to equalize the solute concentrations on each side of the hydrogen-permeable medium. In certain embodiments, the water transported from external environment 116, across hydrogen-permeable medium 114, and into interior volume 104 of housing 102 can be consumed by the electrochemical system (e.g., as a fuel) during electrochemical operation.

A variety of materials and/or configurations can be used to make the hydrogen-permeable medium suitable for performance of forward osmosis (which can, according to certain embodiments, lead to the deliberate introduction of external fluid into the electrochemical cell). For example, in some embodiments, all or part of the hydrogen-permeable medium can be made of polytetrafluoroethylene (PTFE) and/or a woven nylon, polyethylene, polyester which is covered with a hydrophobic coating (e.g., a coating comprising a silane such as trichlorosilane and/or PTFE).

In certain instances, it may be undesirable to emit hydrogen gas from the electrochemical system. For example, because hydrogen gas is combustible and a simple asphyxiant, it is often undesirable for hydrogen gas to be vented into the local environment. It can be, in certain instances, particularly undesirable to emit hydrogen gas into, for example, confined environments where oxygen is present. Emitting hydrogen into such environments could lead to undesired combustion. In some embodiments, it may be undesirable to emit hydrogen into an environment in which an electronic device is present, as emitting hydrogen into such environments could damage or destroy the electronic device.

Figure 1B:
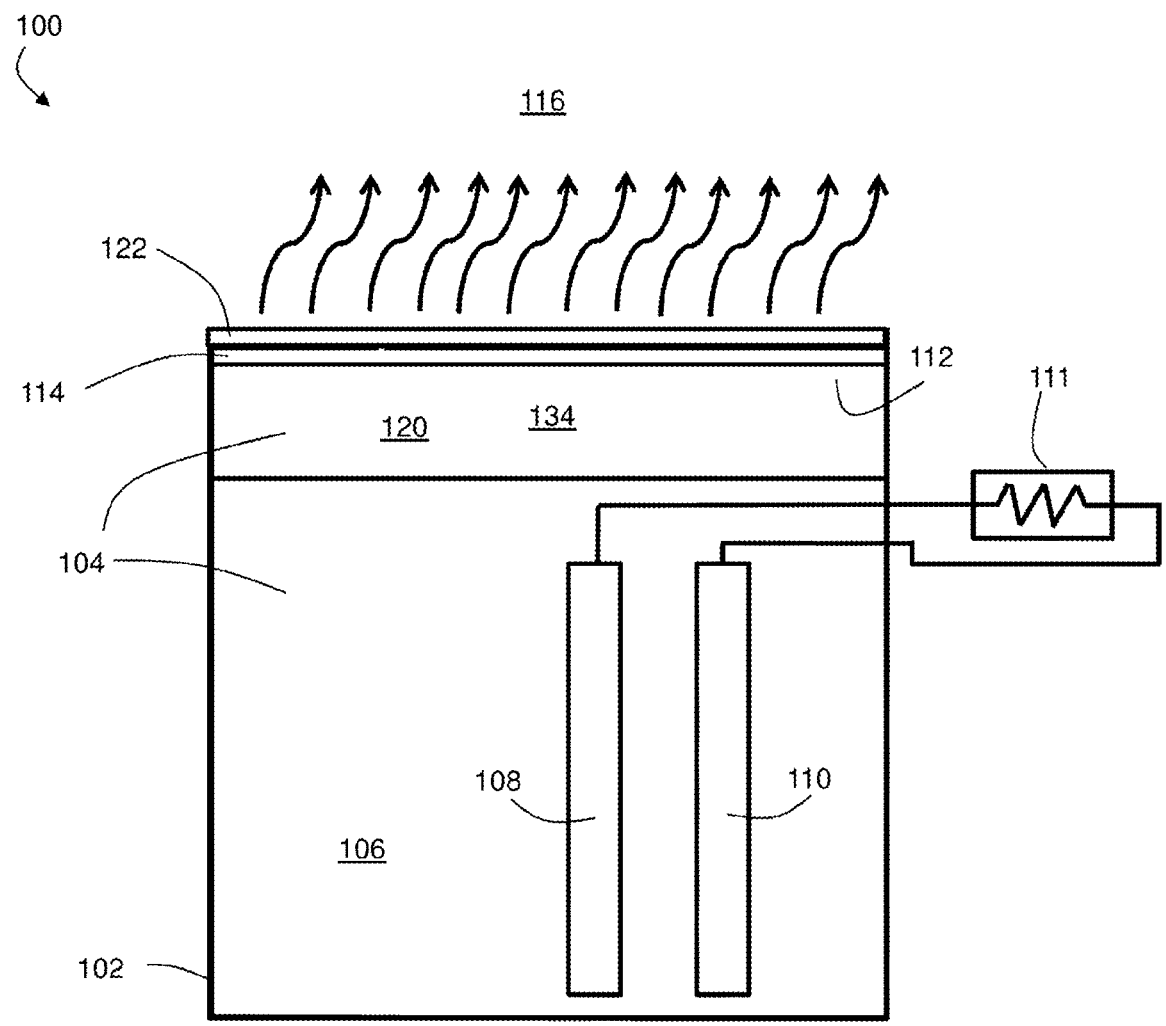
FIG. 1B is, according to some embodiments, a cross-sectional schematic illustration of an electrochemical system comprising a hydrogen-permeable membrane and a hydrogen-reaction system.

Accordingly, in some embodiments (including certain embodiments in which venting hydrogen gas is undesirable, or other embodiments), the electrochemical system comprises a hydrogen-reaction system. The hydrogen-reaction system can be configured, in some embodiments, to receive hydrogen gas from the hydrogen-permeable medium and to facilitate reaction of the hydrogen gas (e.g., with oxygen). FIG. 1B is an exemplary schematic illustration of an electrochemical system 100 in which hydrogen-reaction system 122 is used to react hydrogen gas that is transmitted through hydrogen-permeable medium 114. In FIG. 1B, after hydrogen gas has been transmitted through hydrogen-permeable medium 114, it may contact hydrogen-reaction system 122. Hydrogen-reaction system 122 can be configured such that the hydrogen from hydrogen permeable medium 114 reacts with oxygen (e.g., from within the electrochemical system and/or from an environment outside the electrochemical system), for example, to form water.

The hydrogen-reaction system can have any suitable configuration. In some embodiments, the hydrogen-reaction system is in the form of a layer. In certain embodiments, the layer of the hydrogen reaction system may itself include multiple layers. In some such embodiments, the hydrogen-reaction system can be in the form of a flat sheet (e.g., a multi-layer sheet), for example, having a thickness of less than about 5 mm, less than about 2 mm, or less than about 1 mm. In some embodiments, the hydrogen-reaction system can have a first dimension, perpendicular to its thickness, that is at least about 10, at least about 50, or at least about 100 times longer in length than the thickness of the hydrogen-permeable medium. In certain embodiments, the hydrogen-reaction can have a second dimension, perpendicular to its thickness and to the first dimension, that is at least about 10, at least about 50, or at least about 100 times longer in length than the thickness of the hydrogen-permeable medium.

In some embodiments, the hydrogen-reaction system at least partially overlays the hydrogen-permeable medium. For example, in FIG. 1B, hydrogen-reaction system 122 is positioned over hydrogen-permeable medium 114. In some embodiments, the hydrogen-permeable medium is positioned between the hydrogen-reaction system and the interior volume of the housing. In certain embodiments, the hydrogen-permeable medium is positioned between the hydrogen-reaction system and the electrolyte of the electrochemical system. For example, in FIG. 1B, hydrogen-permeable medium 114 is positioned between interior volume 104 of housing 102 and hydrogen-reaction system 122. In addition, in FIG. 1B, hydrogen-permeable medium 114 is positioned between electrolyte 106 and hydrogen-reaction system 122.

In some embodiments, the hydrogen-reaction system and the hydrogen-permeable medium can be components of an integrated multilayer structure. Generally, an integrated multilayer structure is a structure in which the various layers cannot be separated without physically damaging at least one layer of the multilayer structure. The integrated multilayer structure comprising the hydrogen-permeable medium and the hydrogen-reaction system can be formed, for example, by laminating, adhering, or otherwise forming the layers of the hydrogen-reaction system and the hydrogen-permeable membrane to each other.

Figure 1C:
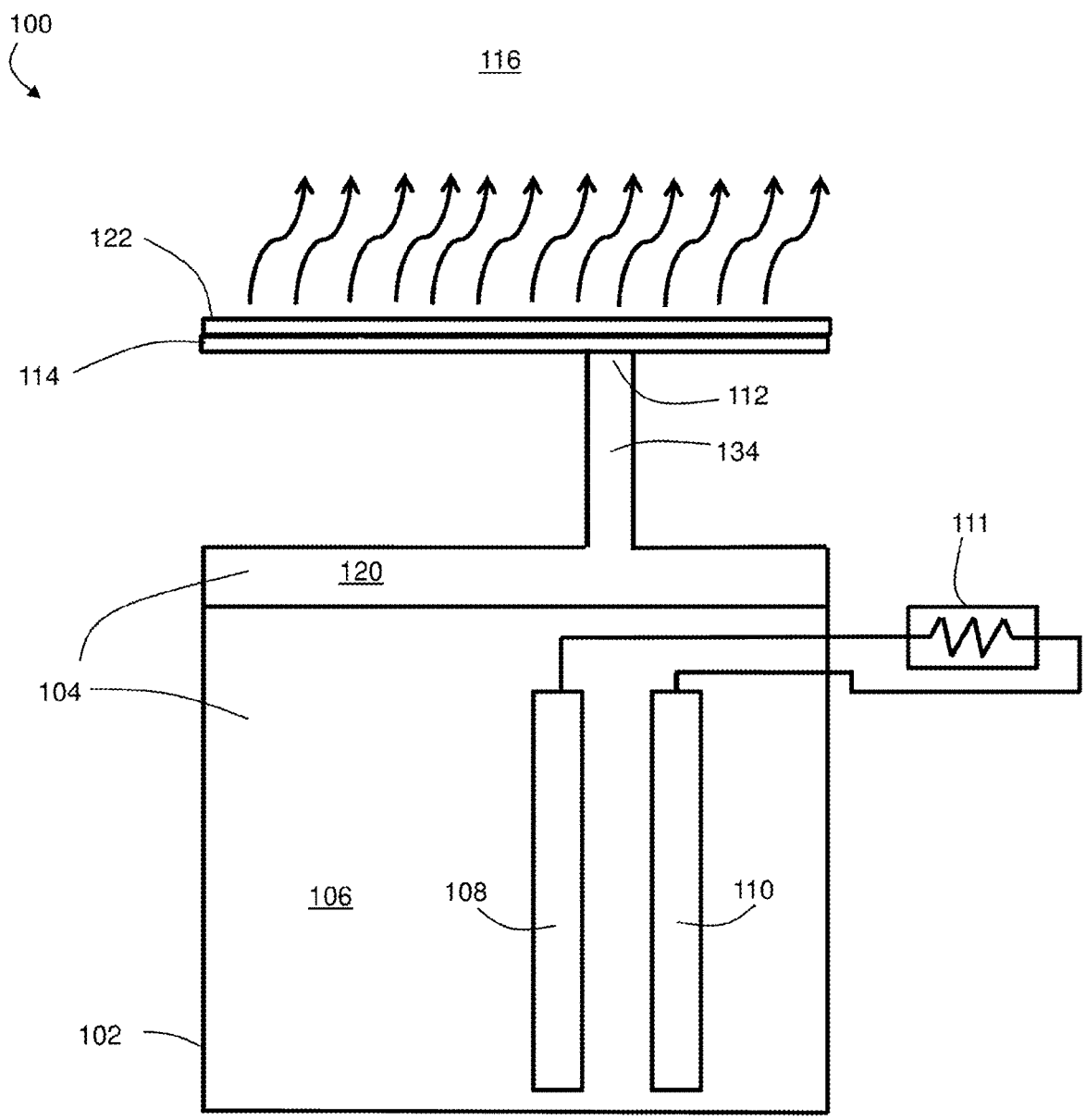
FIG. 1C is a cross-sectional schematic illustration of an electrochemical system comprising a hydrogen-permeable membrane and a hydrogen-reaction system, according to certain embodiments.
Figure 1D:
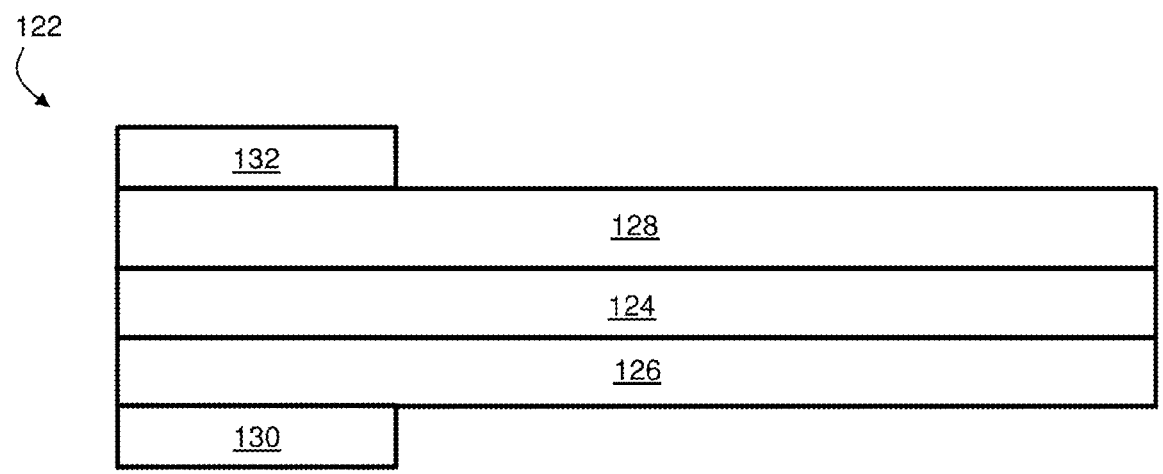
FIG. 1D is, according to some embodiments, a cross-sectional schematic illustration of a hydrogen-reaction system.

The hydrogen-reaction system comprises, according to certain embodiments, an ion-exchange medium. The ion-exchange medium can be positioned, according to some embodiments, between a first electrode and a second electrode of the hydrogen reaction system. For example, as illustrated in FIG. 1D, hydrogen-reaction system 122 comprises ion-exchange medium 124 positioned between first electrode 126 and second electrode 128. The first and/or second electrodes can comprise catalyst, which can be used to convert incoming molecules (e.g., gaseous hydrogen) into ions, which can subsequently be transported through the ion-exchange medium. In some embodiments, the hydrogen-reaction system comprises one or more current collectors. For example, in FIG. 1D, hydrogen-reaction system 122 comprises current collectors 130 and 132. The current collectors can be configured to extract electrical current from the hydrogen-reaction system.

The ion-exchange medium can be configured, in some embodiments, such that it is capable of transmitting ions (e.g., protons, ionic oxygen, hydroxide ions, etc.). In certain embodiments, the ion-exchange medium is configured such that it is substantially impermeable to hydrogen gas, electrolyte, water, and the like. The ion-exchange medium can be in the form of, for example, a membrane or any other suitable form.

In some embodiments, the ion-exchange medium comprises a cation-exchange medium, such as a proton exchange medium. The cation-exchange medium can be configured such that it transmits cations (e.g., protons) while inhibiting the transport of hydrogen gas, electrolyte, water, and the like. For example, the ion-exchange medium can comprise a proton-exchange membrane. In some such embodiments, hydrogen can be transmitted through the hydrogen-permeable medium to the first electrode. At the first electrode a catalyst (e.g., a catalyst comprising a metal, such as platinum, platinized carbon, iridium, and/or ruthenium) may be used to convert the hydrogen gas to protons ($H^+$). The protons may be transported through the ion-exchange medium to the second electrode, where the protons may react with oxygen to form water. In some embodiments, the second electrode also includes a catalyst (e.g., a catalyst comprising a metal, such as platinum, platinized carbon, iridium, and/or ruthenium), which can be configured to catalyze the reaction of protons and oxygen to form water. In some embodiments, once the protons have been reacted with the oxygen to produce water, the water may be expelled into the environment outside the electrochemical system.

The oxygen that reacts with the protons in the hydrogen-reaction system may originate from any suitable source. For example, in some embodiments, the oxygen may be supplied by the electrochemical system, such as from an oxygen-containing compartment associated with the electrochemical system. In some embodiments, the oxygen may originate from the environment in which the electrochemical system is positioned. For example, the oxygen may be present in air to which the hydrogen-reaction system is exposed. In some embodiments, the oxygen may be bubbled, dissolved, or otherwise contained within water to which the hydrogen-reaction system is exposed. Using oxygen from the environment (e.g., an underwater environment) can be advantageous in certain, but not necessarily all, instance. For example, using oxygen from the external environment may, according to certain embodiments, allow one to maintain an additional level of strategic stealth or undetectability. In certain instances, operating the hydrogen-reaction system from the oxygen in the surrounding environment can reduce or eliminate hydrogen bubbling from the electrochemical system.

Examples of proton exchange membranes suitable for use in certain embodiments include, but are not limited to, Nafion® (available from DuPont, Wilmington, Del.), an ionomer typically placed on a perflourinated PTFE backing.

In certain embodiments, the ion-exchange medium comprises an anion-exchange medium. The anion-exchange medium can be configured such that it transmits anions while inhibiting the transport of hydrogen gas, electrolyte, water, and the like.

Two types of anion exchange membranes that could be used in this context are $O^{2-}$ membranes and $OH^-$ transporting membranes. In certain embodiments (including the two specific embodiments described below), the use of an anion exchange membrane can result in the expulsion of water into the interior volume of the housing of the electrochemical system.

For example, in certain embodiments in which an $OH^-$ transporting membrane is employed, oxygen and water can be converted into hydroxide anions via the reduction of $O_2$ at one electrode (e.g., on the exterior of the cell housing), as follows:

$$3/2\ O_2 + 3H_2O + 6e^- \rightarrow 6OH^-$$

In some such embodiments, the hydroxide anions are transmitted across the membrane-electrode assembly into the cell. In some instances, the hydroxide anions can neutralize $H_2$ within the cell (e.g., at the interior electrode) via $H_2$ oxidation, as follows:

$$3H_2 + 6OH^- \rightarrow 6H_2O + 6e^-$$

In some such embodiments, once the hydrogen has been reacted with the hydroxide anions to produce water, the water may be expelled into the interior volume of the housing of the electrochemical system.

In certain embodiments in which an $O^{2-}$ conducting membrane is employed, dissolved or gaseous oxygen is converted to oxide anions at one electrode (e.g., on the exterior of the cell housing), as follows:

$$O_2 + 2e^- \rightarrow O^{2-}$$

In some such embodiments, the oxide anions are transmitted across the membrane-electrode assembly into the cell. In some instances, the oxide anions neutralize $H_2$ within the cell (e.g., at the interior electrode) via $H_2$ oxidation, as follows:

$$H_2 + O^{2-} \rightarrow H_2O$$

In some such embodiments, once the hydrogen has been reacted with the oxide anions to produce water, the water may be expelled into the interior volume of the housing of the electrochemical system.

Examples of anion exchange membranes suitable for use in certain embodiments include, but are not limited to, ion-exchanged Nafion® (e.g., carboxylic nafion 117 and sulfonic nafion), tetra-alkylammonium functionalized polyethylene, tetraalkylammonium functionalized cyclooctene, quaternary ammonia polysulfone, cationic poly(phenylene), and membranes sold under the commercial names Neosepta® (ASTOM Corporation, Japan), Selemion® (AGC Engineering Co., Japan), Ralex® (MEGA a.s., Czech Republic), and Tosflex® (Tosoh Corporation, Japan).

The hydrogen-reaction system can be, according to certain embodiments, a membrane electrode assembly. In some such embodiments, the membrane electrode assembly comprises an ion-exchange membrane (e.g., a proton exchange membrane (PEM), an alkali anion exchange membrane (AAEM)), catalyst, and/or a flat plate current collector. In some such embodiments, the ion-exchange membrane, the catalyst, and/or the flat plate current collector(s) can be assembled as a multi-layer structure. MEA configurations may include catalyst-coated carbon paper for either or both electrodes, and an ion exchange membrane. In some embodiments, the ion exchange membrane may be placed on a porous, hydrophobic backing such as PTFE or another material (e.g., with a pore size less than 100 micrometers) such as woven nylon, polyethylene, polyester which is, optionally, covered with a hydrophobic coating.

In certain embodiments, the hydrogen-reaction system is configured to generate electricity. In some embodiments, an external load can be connected to and driven by the hydrogen-reaction system. For example, in some embodiments, the hydrogen-reaction system can be electrically connected to the electrochemical system (e.g., by electrically connecting the first and second electrodes of the hydrogen-reaction system to the electrodes of the electrochemical system). In some embodiments, the hydrogen-reaction system can be short-circuited, such that electricity is not extracted from the hydrogen-reaction system. In some such embodiments, the hydrogen-reaction system can be used solely to exploit its hydrogen mitigating function.

In one set of embodiments, the hydrogen-reaction system can be configured to utilize local oxygen to oxidize hydrogen to water until the oxygen source had been depleted. Subsequently, in some such embodiments, hydrogen gas can be vented by the electrochemical system. This mode of operation can reduce the risk of explosion in, for example, confined volumes such as profiling floats and unmanned underwater vehicles (UUVs). At no point in time would there be sufficient quantities of both hydrogen and oxygen gas simultaneously present in the vessel to cause an explosion. In some such embodiments, the initial oxygen supply can be depleted as it is reacted with the hydrogen from the hydrogen-permeable membrane to form water. Once the oxygen has been depleted, hydrogen can be safely vented into the remaining space without concern of creating an explosive combination of hydrogen and oxygen. In some such embodiments, the confined volume can be purged safely and responsibly at a later point in time (e.g., when the UUV reaches the surface of the water).

In some embodiments, water created by the hydrogen-reaction system can be transported into the interior volume of the housing of the electrochemical system. In some such embodiments, the electrochemical system comprises a fluidic pathway arranged to transport water from the hydrogen-reaction system to the interior volume of the housing. In FIG. 1B, electrochemical system 100 comprises fluidic pathway 134, which can be used to transport water from hydrogen-reaction system 122 to interior volume 104 of housing 102. (FIG. 1C is a cross-sectional schematic illustration of another embodiment in which fluidic pathway 134 comprises an elongated channel between the interior volume 104 of housing 102 and hydrogen-permeable medium 114.) In some embodiments, water that is transported into the housing of the electrochemical system can be used as a reactant in the electrochemical reaction. For example, the electrochemical system may generate electrical current using an electrochemical reaction that consumes water, as described in more detail below.

By using the electricity generated by the hydrogen-reaction system and/or by transporting water generated by the hydrogen-reaction system to the interior volume of the electrochemical system, the overall energy density and/or specific energy of the electrochemical system may be enhanced.

In certain embodiments, the electrochemical systems described herein can be at least partially submerged in a water-containing liquid environment. For example, referring to FIGS. 1A-1B, in some embodiments, external environment 116 is a water-containing liquid environment, in which electrochemical system 100 can be submerged during operation. The electrochemical system may be submerged in any of a number of water-containing liquid environments. For example, in some embodiments, the electrochemical system is at least partially submerged in a saline aqueous solution, such as seawater. In some embodiments, the electrochemical system is at least partially submerged in fresh water (e.g., in a freshwater lake, stream, etc.).

In some embodiments, hydrogen can be vented into the water-containing liquid. For example, referring to FIG. 1A, in some embodiments, hydrogen gas can be vented from interior volume 104 of housing 102, through hydrogen-permeable medium 114, and into external environment 116 (which can be a water-containing liquid).

In certain embodiments, the hydrogen-reaction system is in contact with oxygen-containing water. In some such embodiments, oxygen from a water-containing liquid environment can react with hydrogen in the hydrogen-reaction system. For example, referring to FIG. 1B, in some embodiments, oxygen from external environment 116 can be transported to hydrogen-reaction system 122, where it may react with protons formed from hydrogen gas that is transported through hydrogen-permeable medium 114.

In certain embodiments, at least a portion of the water within the water-containing liquid in which the electrochemical system is at least partially submerged can be transported across the hydrogen-permeable medium into the interior volume of the housing. In certain embodiments, at least a portion of the water within the water-containing liquid in which the electrochemical system is at least partially submerged can be transported across an osmotic medium (which may be the same as or different from the hydrogen-permeable medium) into the interior volume of the housing. For example, referring to FIG. 1A, in some embodiments, water from external environment 116 can be transported through hydrogen-permeable medium 114 into interior volume 104 of housing 102. In some such embodiments, the electrochemical system can consume water as a reactant. For example, the water that is injected into the electrochemical cell may be consumed as the electrochemical reaction within the electrochemical cell proceeds. In this way, the water-containing liquid environment in which the electrochemical apparatus is at least partially submerged can serve as a fuel source for the electrochemical cell in the apparatus.

The electrochemical systems described herein can employ a variety of electrochemical cell chemistries. In some embodiments, an electrode within the electrochemical system comprises an aluminum-based electrode active material. Electrode active materials are generally understood by those of ordinary skill in the art to be the materials in the electrodes that participate in the electrochemical reaction(s) of the electrochemical cell. Examples of such electrochemical cell chemistries include, but are not limited to, aluminum-water electrochemical cells, aluminum-permanganate electrochemical cells, aluminum-silver chloride electrochemical cells, and aluminum hydrogen peroxide electrochemical cells. In some embodiments, the aluminum-based electrode active material can comprise at least about 50 wt %, at least about 75 wt %, at least about 90 wt %, at least about 95 wt %, or at least about 99 wt % aluminum metal.

As described above, in some embodiments, the electrochemical system is configured such that the electrochemical reaction generates hydrogen during operation. Examples of such electrochemical cell chemistries include, but are not limited to, lead-acid electrochemical cells, zinc-air electrochemical cells, magnesium-water electrochemical cells, magnesium silver chloride electrochemical cells, lithium-water electrochemical cells, nickel metal hydride electrochemical cells, aluminum-water electrochemical cells, aluminum-permanganate electrochemical cells, aluminum-silver chloride electrochemical cells, and aluminum hydrogen peroxide electrochemical cells.

In certain embodiments, the electrochemical system is configured such that the electrochemical reaction consumes water (e.g., as a reactant) during operation. Examples of such electrochemical cell chemistries include, but are not limited to, magnesium-water electrochemical cells, magnesium silver chloride electrochemical cells, lithium-water electrochemical cells, aluminum-water electrochemical cells, aluminum-permanganate electrochemical cells, aluminum-silver chloride electrochemical cells, and aluminum hydrogen peroxide electrochemical cells.

The electrochemical apparatus described herein may be used in a wide variety of applications. For example, in some embodiments, the electrochemical system is part of an underwater vehicle. In certain embodiments, the electrochemical system is part of an underwater sensor system.

The following example is intended to illustrate certain embodiments of the present invention, but do not exemplify the full scope of the invention.

Example

Figure 3:
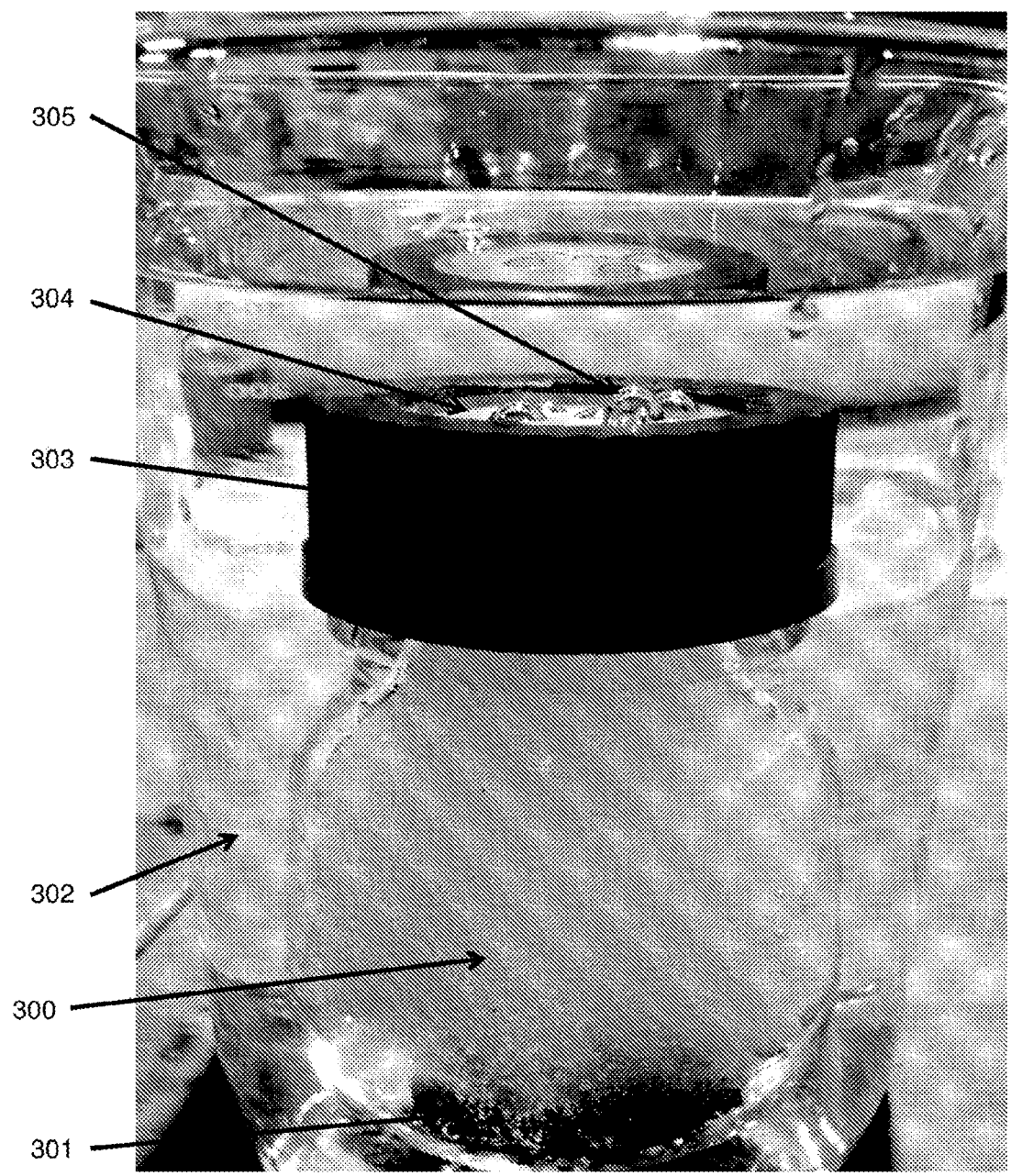
FIG. 3 is a photograph of an apparatus used in exemplary experiments in which hydrogen gas was vented through a hydrogen-permeable membrane.

This example describes the operation of an experimental apparatus in which a hydrogen-permeable membrane was used to vent hydrogen gas from an interior compartment containing electrolyte and aluminum metal to an exterior environment. A working prototype was made, as pictured in FIG. 3. The apparatus comprised a glass vessel 300 with a membrane 304 sealed between the top opening of the vessel and a sealed cap 303. A number of apparatuses were tested, each including a different Sterlitech PTFE unlaminated membrane. Six different membranes with the following pore sizes were tested: 20 micrometers, 10 micrometers, 5.0 micrometers, 2.0 micrometers, 1.0 micrometer, 0.2 micrometers.

Aluminum chunks 301 were placed in vessel 300. Caustic electrolyte was then added to vessel 300 until the vessel was almost full. Adding the caustic electrolyte caused the aluminum to corrode vigorously, creating hydrogen gas. The entire apparatus was submerged in a secondary beaker full of water 302. The small gas bubbles created by the corroding aluminum were vented through the pores of the membrane, emerging as relatively large bubbles 305 on the exterior surface of the membrane.

Of the various membranes tested, the membranes with intermediate pore sizes (10 micrometers, 5.0 micrometers, 2.0 micrometers, and 1 micrometer) worked best at allowing gas to pass while simultaneously blocking the ingress of water. The membranes with the largest pore sizes (20 micrometers) were big enough to allow water to come into the vessel through the pores with just minor perturbation, while the membranes with the smallest pore sizes (0.2 micrometers) required a large pressure differential across the membrane to sustain the necessary hydrogen exhaust flow rates. The membranes with intermediate pore sizes provided both good water-tightness and low-pressure flow.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical system, comprising:
   a housing comprising an interior volume in which a liquid electrolyte is directly exposed to a first electrode comprising an aluminum-based electrode active material and a second electrode, the interior volume comprising an outlet; and
   a hydrogen-permeable medium that is not substantially permeable to the liquid electrolyte, the medium associated with the outlet and defining an interface between the interior volume of the housing and an environment external to the interior volume, wherein:

the first electrode is an anode; and the second electrode is a cathode.

2. The electrochemical system of claim 1, wherein the hydrogen-permeable medium is a layer associated with the outlet.

3. The electrochemical system of claim 1, wherein the electrolyte is configured to surround the anode and the cathode uninhibited.

4. The electrochemical system of claim 3, wherein the hydrogen-permeable membrane is a microporous membrane.

5. The electrochemical system of claim 1, wherein the hydrogen-permeable medium is hydrophobic.

6. The electrochemical system of claim 1, wherein the hydrogen-permeable medium is capable of performing forward-osmosis such that water from the environment external to the interior volume can be osmotically transported across the hydrogen-permeable medium into the interior volume.

7. The electrochemical system of claim 1, wherein the electrochemical system comprises an aluminum-water electrochemical cell.

8. A method comprising at least partially submerging the housing of claim 1 into a water-containing liquid.

9. An electrochemical system, consisting essentially of:

a housing comprising an interior volume in which a liquid electrolyte is exposed to a first electrode and a second electrode, the interior volume comprising an outlet; and a hydrogen-permeable medium that is not substantially permeable to the liquid electrolyte, the medium associated with the outlet and defining an interface between the interior volume of the housing and an environment external to the interior volume, wherein:

the first electrode is an anode;

the second electrode is a cathode;

a headspace within the interior volume; and an external load connected to the cathode and the anode.

* * * * *